US012030031B2

(12) United States Patent
Szczap et al.

(10) Patent No.: US 12,030,031 B2
(45) Date of Patent: Jul. 9, 2024

(54) ELECTROSTATIC SPRAY DRYER APPARATUS AND METHOD

(71) Applicant: Spraying Systems Co., Wheaton, IL (US)

(72) Inventors: Joseph P. Szczap, Naperville, IL (US); Christopher W. Barnes, Montgomery, IL (US)

(73) Assignee: Spraying Systems Co., Wheaton, IL (US)

( * ) Notice: Subject to any disclaimer, the term of this patent is extended or adjusted under 35 U.S.C. 154(b) by 562 days.

(21) Appl. No.: 17/462,261

(22) Filed: Aug. 31, 2021

(65) Prior Publication Data

US 2022/0062841 A1 Mar. 3, 2022

Related U.S. Application Data

(60) Provisional application No. 63/072,582, filed on Aug. 31, 2020.

(51) Int. Cl.
*B05B 5/00* (2006.01)
*B01J 2/04* (2006.01)
*B05B 5/08* (2006.01)

(52) U.S. Cl.

CPC ................. *B01J 2/04* (2013.01); *B05B 5/081* (2013.01); *B05B 5/087* (2013.01)

(58) Field of Classification Search
CPC .......... B05B 5/001; B05B 5/081; B05B 5/087
See application file for complete search history.

(56) References Cited

U.S. PATENT DOCUMENTS 2,856,278 A * 10/1958 Bray ......................... C05C 3/00 423/388
5,651,952 A * 7/1997 Grudnoff ............... B01J 10/005 423/621

(Continued)

FOREIGN PATENT DOCUMENTS

CN 101555471 A 10/2009
CN 204134241 U 2/2015

(Continued)

OTHER PUBLICATIONS

European Patent Office, International Search Report and Written Opinion in corresponding International Patent Application No. PCT/US2021/048349 dated Dec. 22, 2021 (6 pages).

*Primary Examiner* — Timothy Kennedy
(74) *Attorney, Agent, or Firm* — Leydig, Voit & Mayer, Ltd

(57) ABSTRACT

An electrostatic spray drying system comprising an electrostatic spray nozzle for directing electrically charged liquid into a drying chamber, a drying gas inlet from which drying gas is simultaneously directed, and a conical powder direction plenum for receiving drying gas and entrained dried powder for direction to a filter containing powder separation plenum via a connecting conduit. The powder direction plenum and connecting conduit each have a surrounding water jacket heat exchanger through which cooling water is directed for cooling the drying gas and powder below damaging temperatures prior to entry into the powder separation plenum. The powder separation plenum has a return line for redirecting separated drying gas to the drying chamber through a condenser, blower, and heater for reuse in the system, with condensed water being selectively redirected to the inlet of the powder direction plenum heat exchanger and/or to the cooling water supply.

13 Claims, 4 Drawing Sheets

(56) References Cited

U.S. PATENT DOCUMENTS

| | | | |
|---|---|---|---|
| 6,223,455 B1 | 5/2001 | Chickering, III et al. | |
| 8,322,046 B2* | 12/2012 | Wang | A61K 9/1623 |
| | | | 34/286 |
| 8,966,783 B2* | 3/2015 | Kitamura | F26B 5/04 |
| | | | 34/372 |
| 9,993,787 B1 | 6/2018 | Beetz et al. | |
| 10,279,359 B2* | 5/2019 | Ackerman | F26B 21/02 |
| 10,286,411 B2 | 5/2019 | Ackerman et al. | |
| 10,399,098 B2* | 9/2019 | Bright | F26B 21/086 |
| 10,543,495 B2* | 1/2020 | Ackerman | B05B 7/066 |
| 11,033,914 B2* | 6/2021 | Ackerman | B01D 1/18 |
| 2008/0155853 A1* | 7/2008 | Wang | F26B 5/065 |
| | | | 34/286 |
| 2009/0263293 A1* | 10/2009 | Motegi | B03C 3/38 |
| | | | 422/120 |
| 2013/0126102 A1* | 5/2013 | Kitamura | B01J 2/04 |
| | | | 159/48.1 |
| 2017/0120267 A1* | 5/2017 | Ackerman | F26B 21/086 |
| 2017/0144120 A1* | 5/2017 | Bright | B05B 5/043 |
| 2017/0151576 A1* | 6/2017 | Ackerman | B01D 46/58 |
| 2018/0236468 A1* | 8/2018 | Ackerman | B05B 5/043 |
| 2019/0022675 A1* | 1/2019 | Ackerman | B05B 5/005 |
| 2022/0355316 A1* | 11/2022 | Kito | B05D 1/04 |

FOREIGN PATENT DOCUMENTS

| | | |
|---|---|---|
| CN | 204411746 U | 6/2015 |
| WO | WO 2005/112882 A2 | 12/2005 |

* cited by examiner

ELECTROSTATIC SPRAY DRYER APPARATUS AND METHOD

CROSS-REFERENCE TO RELATED APPLICATIONS

This patent application claims the benefit of U.S. Provisional Patent Application No. 62/072,582, filed on Aug. 31, 2020, which is incorporated by reference.

FIELD OF THE INVENTION

The present invention relates generally to electrostatic spray dryers, and more particularly to an apparatus and method for spray drying liquids into dry powder form.

BACKGROUND OF THE INVENTION

Spray drying is a well-known and extensively used process in which liquid slurries are sprayed into a drying chamber into which heated air is introduced for drying the liquid into powder. The slurry commonly includes a liquid, such as water, an ingredient, such as a food, flavor, or pharmaceutical, and a carrier. During the drying process, the liquid is driven off leaving the ingredient in powder form encapsulated within the carrier. Spray drying also is used in producing powders that do not require encapsulation, such as various food products, additives, and chemicals.

Electrostatic spray drying allows for processing at temperatures below what is commonly achievable with conventional spray drying techniques, which makes the technology well-suited for processing of heat-sensitive pharmaceutical, biological, and nutraceutical compounds into dried powders. However, the potency or viability of extremely heat-sensitive compounds can be degraded after exposure at temperatures exceeding 35° C.-75° C. for more than a few seconds. Despite the lower operating temperature capability provided by the electrostatic drying process, powders can be exposed to damaging temperatures exceeding these limits for several minutes before the dried powder is finally collected and cooled outside of the process. This can particularly occur in the downstream filter apparatus which separates the dried powder from the drying gas, where dried particles can build up or remain in the filter system for prolonged times.

OBJECTS AND SUMMARY OF THE INVENTION

It is an object of the present invention to provide an electrostatic spray drying apparatus and method for more effectively and efficiently spray drying heat sensitive powders.

Another object is to provide an electrostatic spray drying apparatus and method as characterized above that can be operated at substantially higher production rates than conventional spray drying systems.

A further object is to provide such an apparatus and method of the above kind that can be operated at higher temperatures for quicker and more efficient spray drying, even when producing heat sensitive powders.

Still another object is to provide an electrostatic spray drying apparatus and method of the foregoing type in which the dried powder is separated from the drying gas in a separation plenum without exposure to high temperature drying gases.

Yet another object is to provide such an electrostatic spray drying apparatus that is relatively simple in design and lends itself to economical manufacture.

Other objects and advantages of the invention will become apparent upon reading the following detailed description and upon reference to the drawings.

Figure 1:
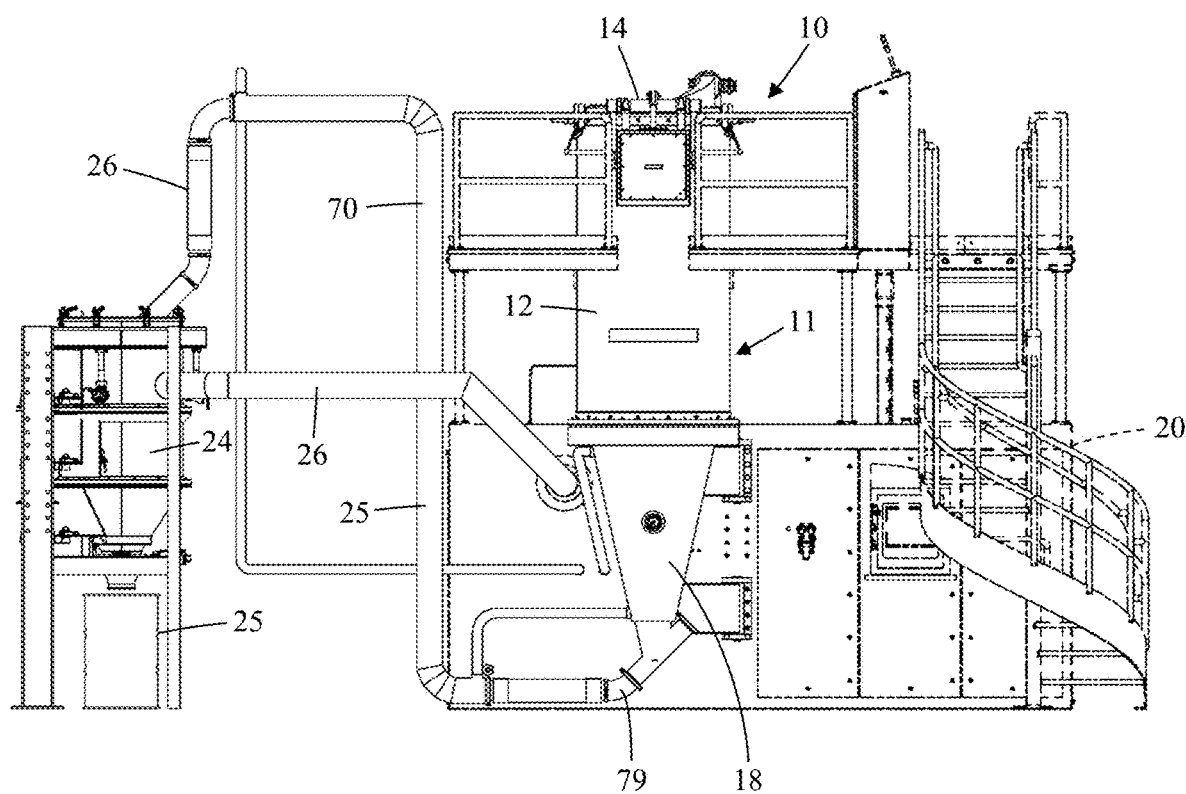
FIG. 1 is a front elevational view of an illustrative spray drying system in accordance with the invention.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE PREFERRED EMBODIMENT

Figure 2:
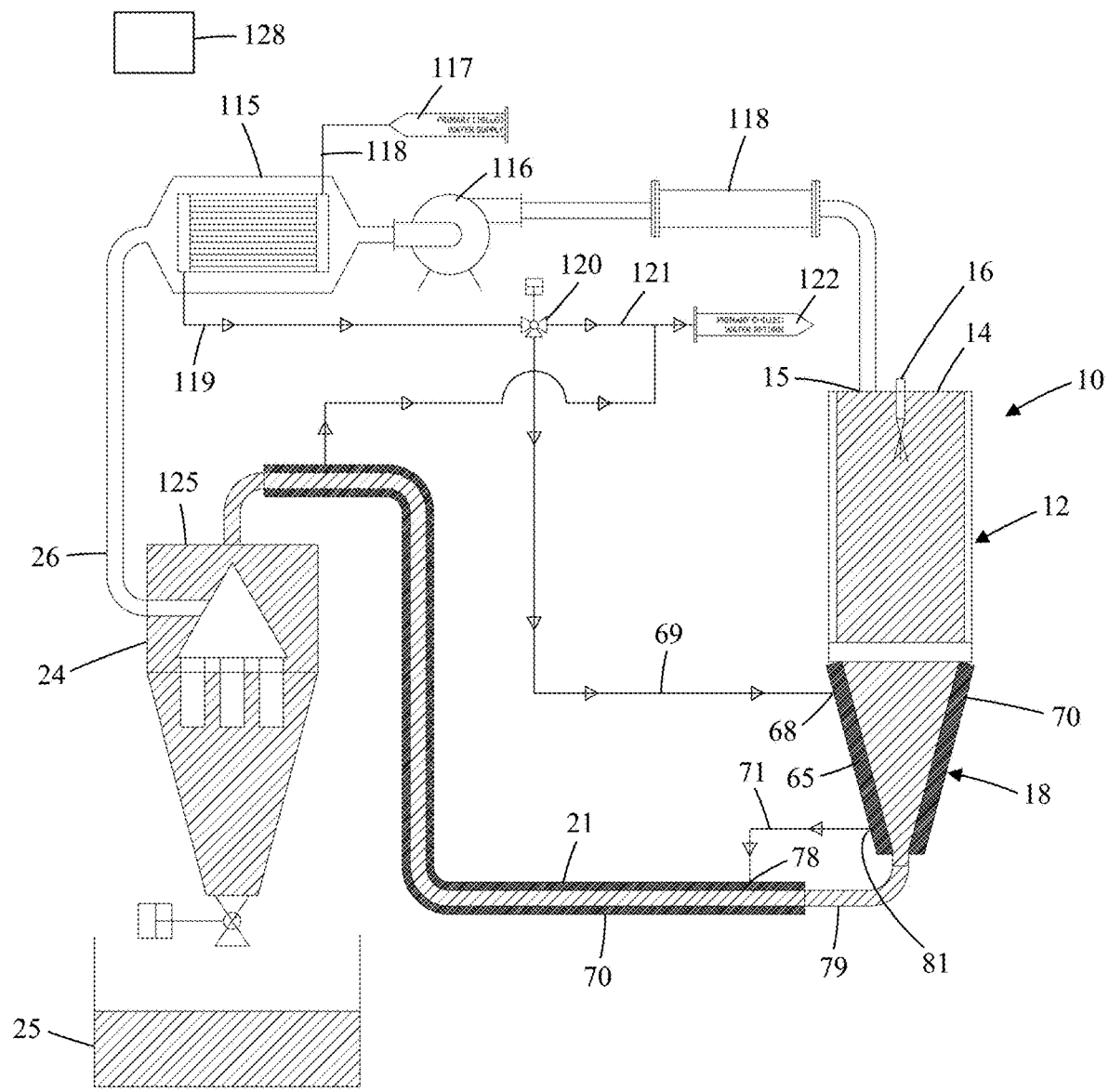
FIG. 2 is a diagrammatic depiction of the spray drying system shown in FIG. 1.
Figure 3:
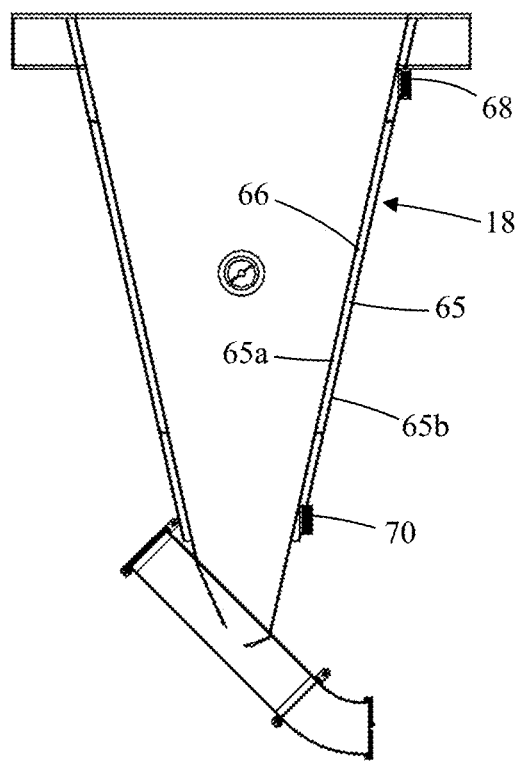
FIG. 3 is an enlarged vertical section of the water jacketed cone shaped powder direction plenum of the illustrated spray drying system.
Figure 4:
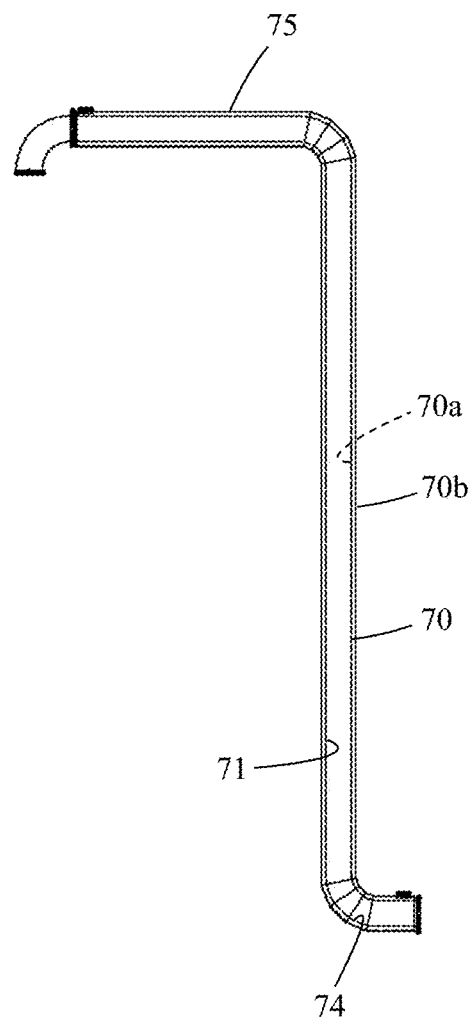
FIG. 4 is an enlarged front elevational view of the water jacketed connecting pipe for coupling between the powder direction plenum and the powder separation plenum of the illustrated embodiment.

Referring now more particularly to the FIGS. 1 and 2 drawings, there is shown an illustrative electrostatic spray drying system 10 in accordance with the invention which includes a processing tower 11 comprising a drying chamber 12 in the form of an upstanding cylindrical body; a top closure arrangement in the form of a cover or lid 14 for the drying chamber 12 having a heating gas inlet 15 (FIG. 2) and an electrostatic liquid spray nozzle assembly 16; and a bottom closure arrangement coupling a powder direction plenum 18 in the form of a cone supported to the bottom of the drying chamber 12. A frame supports the processing tower 11 in upright condition, which in this case includes stairs 20 for the operating personnel. A conduit 21 in the form of a tube communicates a drying gas and powder mixture from the powder direction plenum 18 to a powder separation plenum 24 supported in upright position by the frame adjacent the processing tower 11 for filtering powder from the drying gas and directing the dried powder into a powder collection container or drum 25 and directing the filtered drying gas to return line 26.

Figure 5:
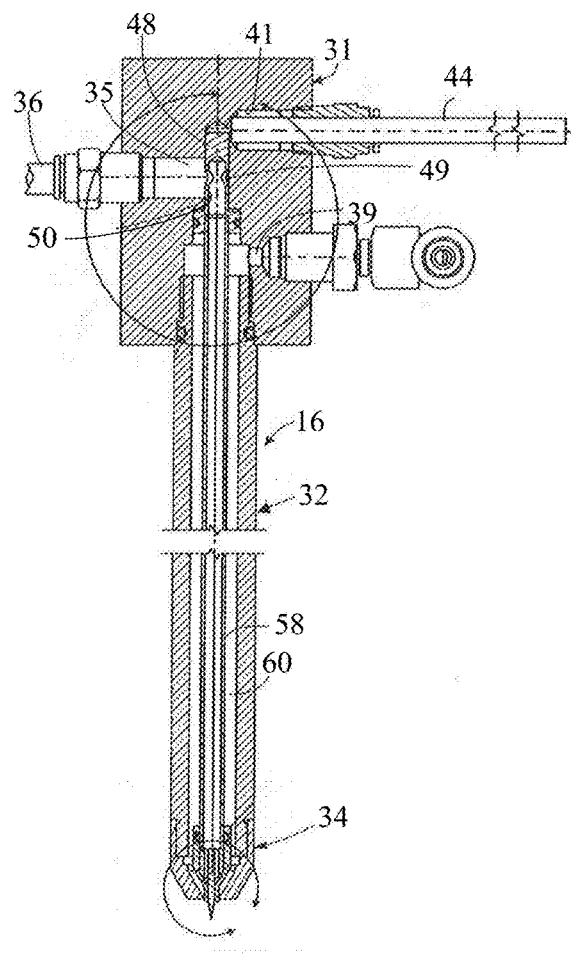
FIG. 5 is an enlarged vertical section of the electrostatic spray nozzle assembly of the illustrated spray drying system.
Figure 6:
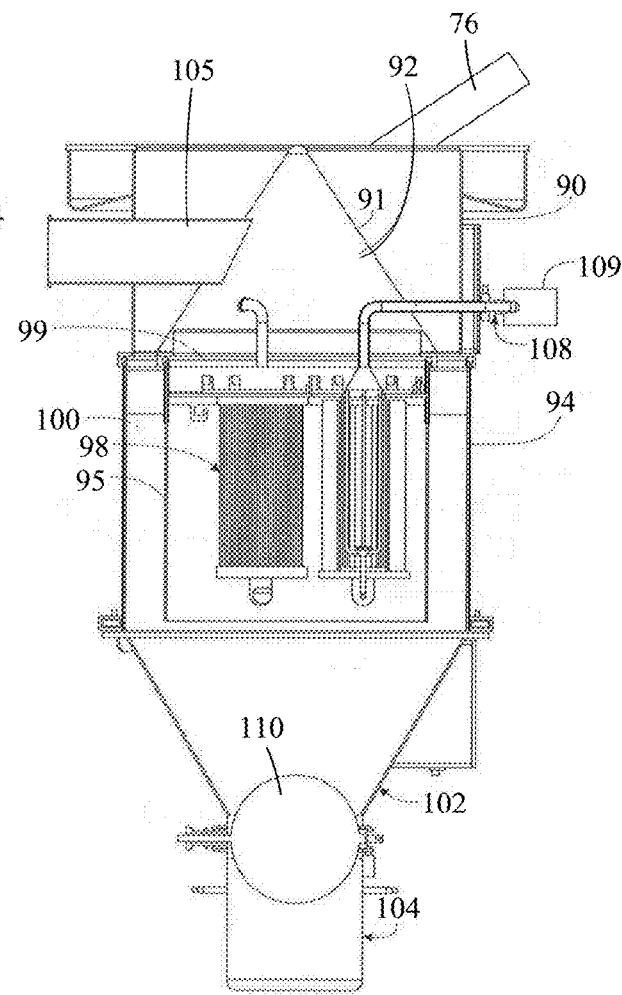
FIG. 6 is an enlarged partial vertical section of the powder separation plenum of the illustrated spray dryer system.

The drying chamber 12 and electrostatic spray nozzle assembly 16 may be of the type disclosed in U.S. Pat. No. 10,286,411 assigned to the same assignee as the present application, disclosure of which is incorporated herein by reference. The spray nozzle assembly 16, as depicted in FIG. 5, utilizes a pressurized air for directing a spray of electrostatically charged particles into the drying chamber 12 for quick and efficient drying of liquid slurries into desired powder form. The illustrated spray nozzle assembly 16 includes a nozzle supporting head 31, an elongated nozzle barrel or body 32 extending downstream from the head 31, and a discharge spray tip assembly 34 at a downstream end of the elongated nozzle body 32. The head 31 in this case is made of plastic or other non-conductive material and is formed with a radial liquid inlet passage 35 that communicates with a liquid supply line of 36 and in turn a supply of liquid to be dried.

The nozzle supporting head 31 in this case further is formed with a radial pressurized atomizing air inlet passage 39 downstream of said liquid inlet passage 35 that communicates with a suitable pressurized air supply. A radial passage 41 upstream of the liquid inlet passage 35 receives a high voltage cable 44 in abutting electrically contacting relation to an electrode 48 axially supported within the head 31 and extending downstream of the liquid inlet passage 35.

For enabling liquid passage to the spray tip assembly 34, the electrode 48 is formed with radial and axial passages 49, 50 communicating with a liquid feed tube 58, made of stainless steel or other electrically conductive metal, for communicating liquid from the axial electrode liquid passage 50 to the downstream discharge spray tip assembly 34. An annular atomizing air passage 60 is defined between the liquid feed tube 58 and the outer cylindrical body 32 of the spray nozzle assembly 16 for directing atomizing gas from the atomizing air inlet 39 to the spray tip assembly 34 for atomizing the discharging liquid spray from the spray tip assembly 34. The cylindrical body of the drying chamber 12 preferably is made of a non-electrically conductive material and includes a removable and replaceable internal liner for facilitating changeover between different liquids to be sprayed, again as disclosed in applicant's above referenced patent.

In carrying out an important aspect of the present embodiment, the powder direction plenum 18 and the connecting conduit 21 between the powder direction plenum 18 and powder separation plenum 24 both comprise water jacket constructed heat exchangers for cooling the gas and entrained powder mixture immediately upon discharge from the drying chamber 12 for limiting exposure of the powder to damaging temperatures. The conical powder direction plenum 18, which tapers inwardly in a downstream direction, is secured to the underside of the drying chamber 12 for directly receiving dried powder and heating gas from the drying chamber 12. The inwardly tapered conical wall of the powder direction plenum 18 comprises a water jacket constructed heat exchanger 65 defined by inner and outer conical walls 65*a*, 65*b* which define a conical cooling water flow passage 66 (FIGS. 2 and 3). The conical heat exchanger 65 in this case includes a cooling water inlet 68 adjacent an upper end thereof connected to a hose 69 coupled to a chilled water supply as will become apparent, and a cooling water return outlet 70 adjacent a lower end of the heat exchanger 65 coupled to an outlet hose 71. Chilled cooling water, preferably controlled at a temperature of between about 4.5° C. and 12.8° C. (i.e. 40°-55° F.) directed into the cooling water inlet 68 continuously flows through the flow passage 66 of conical heat exchanger 65 such that powder and drying gas directed into the powder direction plenum 18 and contact with the heat exchanger 65 are immediately subjected to cooling upon discharge from the drying chamber 12.

In carrying out this embodiment, the connecting conduit 21 between the powder direction plenum 18 and the powder separation plenum 24 also comprises a water jacket constructed heat exchanger 70 having inner and outer walls 70*a*, 70*b* that define an annular cooling water flow passage 71, with the inner wall 70*a* being sized such that the gas will efficiently convey all entrained powder from the powder direction plenum 18 to the powder separation plenum 24. The heat exchanger 70 in this case has an angled upstream end 74 coupled to an underside of the powder direction plenum 18 and an upper angled end 75 connected to and communicating with an inlet 76 in an upper end of the powder separation plenum 24 for directing pre-cooled powder and drying gas into the plenum in a downward and tangential direction.

The connecting conduit heat exchanger 70 has a chilled water inlet 78 coupled to a chilled water supply line 79 communicating from an outlet 81 adjacent a lower end of the powder collection plenum 18 for receiving chilled water directly from powder direction plenum heat exchanger 65. Hence, it will be seen that heating gas and powder discharging from the drying chamber 12 will come into substantial contact with the heat exchanging surfaces of the conical powder direction plenum heat exchanger 65 and the connecting conduit heat exchanger 70 for cooling before it is directed into the separation plenum 24. In practice, the heating gas and powder mixture discharging from the drying chamber at temperatures of 60° C.-90° C. can be cooled to temperatures of between about 25° C. and 50° C. (i.e. close to ambient temperature) prior to direction into the powder separation plenum 24. Such intermediate and substantial cooling has been found to prevent damage to even highly temperature sensitive powders.

The illustrated powder separation plenum 24, as depicted in FIG. 6, may be of a type depicted in applicant's above referenced patent, basically comprising an upper cylindrical plenum 90 having said powder receiving inlet 76; a downwardly opening conically configured exhaust plenum 91 disposed within said upper cylindrical plenum 90 that defines on its underside an exhaust chamber 92; a lower cylindrical plenum 94; a cylindrical filter element shroud 95 concentrically supported within the lower cylindrical plenum 94 within which a plurality of circumferentially spaced filters 98 (only one of which is shown in FIG. 6) are supported in depending relation to a respective opening in a support plate 99.

During operation of the spray drying system 10, it will be seen that drying gas and powder directed into the powder direction plenum 24 will be channeled about the conical exhaust plenum 91 into the annular passageways 100 about the inner cylindrical filter element shroud 95 downwardly into a powder direction cone 102 for collection in a collecting chamber 104. While most of the dried powder remaining in the gas flow will migrate into the powder collection chamber 104, fine gas air borne particulate matter will be separated and retained by the annular filters 98 as the drying gas passes upwardly through the filters 98 into the drying gas exhaust plenum 91 for exit through a drying gas exhaust port 105 for recirculation to the drying chamber 12, as will be become apparent. For periodic cleaning of the filters 98 of buildup powder, the cylindrical filters 98 each have a respective reverse gas pulse cleaning device 108 cyclically operated by a control valve 109. A butterfly valve 110 in this case is mounted at an upper end of the collection chamber 104 and is operable for controlling the direction of powder into the collection chamber 104.

For recirculating and reusing exiting drying gas from the separation plenum 24, the separation plenum outlet port 105 is coupled to the recirculation line 26 which in turn is connected to the heating gas inlet port 15 of the top cover 14 of the drying chamber 12 through a condenser 115, a blower 116, and a drying gas heater 118 (FIG. 2). The condenser 115 removes any water vapor from the exhaust gas flow stream by means of cold water chilled condensing coils 115a having respective cold water supply 117 communicating with the condenser through inlet line 117a. The dried gas may then directed by the blower 116 through the gas heater 118 which reheats the drying gas after cooling in the condenser 115 to a predetermined heated temperature for the particular powder drying operating for redirection back to the heating gas inlet port 15 and into the drying chamber 12.

In keeping with a further feature of the present embodiment, the chilled water exiting the condenser 115 may be recirculated, in whole or in part, to the water jacket constructed heat exchanger 65 of the powder direction plenum 18. In the illustrated embodiment, the condenser 115 is coupled to a three-way diverting valve 120 enabling chilled water from the condenser 115 to be directed to the inlet 68 of the powder direction plenum heat exchanger 65 or to a return line 121 to the water supply 122 for re-cooling. In further carrying out this feature, the position of the valve 120, and correspondingly the chilled water flow rates, are controlled by a control 128 on a temperature basis from a temperature sensor 125 located in the powder separation plenum. Hence, the temperature of the child water supply to the powder collection cone heat exchanger can be selectively controlled for predetermined cooling of the powder gas mixture exiting the drying chamber.

From the foregoing, it can be seen that the heat exchange features of the powder direction cone and connection tube between the powder direction cone and the separation plenum enable immediate cooling of gas and entrained powder mixture exiting the drying chamber well before it reaches the gas powder separation apparatus, hence limiting the exposure of the dried powder to damaging temperatures. The chilled water can be precisely controlled by upstream temperature sensing. The electrostatic spray drying combined with such immediate gas powder and gas cooling makes the system well suited for processing heat sensitive powders. The immediate product cooling results in increased potency of the finished dried product, allowing use of the system on extremely heat sensitive formulations. Moreover, the production of dried powder can be increased substantially since the inlet temperature of the drying gas can be operated at higher temperatures that improve the evaporation rate in the drying chamber. Since the exposure time in that area is minimal, because the powder reaches the cooling section immediately, the powder can be produced at a substantially faster rate while still being protected.

What is claimed:

1. An electrostatic spray drying system for drying liquid into powder form comprising:
   an elongated structural body supported in upright position;
   an upper end closure arrangement and a lower end closure arrangement at opposite upper and lower ends of the elongated body, respectively, for forming a drying chamber within said elongated body;
   an electrostatic spray nozzle supported in said upper closure arrangement;
   said electrostatic spray nozzle including a nozzle body having a discharge spray tip at a downstream end for directing liquid into said drying chamber;
   said electrostatic spray nozzle having a liquid inlet for coupling to a supply of liquid to be discharged into the drying chamber and an electrode for coupling to an electrical source for electrically charging liquid passing through said spray nozzle for discharge from said discharge spray tip into said drying chamber as fine liquid particles;
   said upper closure arrangement having a drying gas inlet for directing heated drying gas into said drying chamber for drying the discharged liquid particles into powder;
   said lower closure arrangement including a powder direction plenum for receiving drying gas and entrained powder from said drying chamber;
   a powder separation plenum downstream of said powder direction plenum; a connecting conduit between said powder direction plenum and said powder separation plenum for directing dried powder and gas exiting the powder direction plenum to said powder separation plenum; said powder separation plenum including at least one filter element for separating dried powder from the drying gas and directing separated gas to a gas outlet of the powder separation plenum while directing separated dried powder to a powder collection container;
   said powder direction plenum including an outer water jacket heat exchanger disposed in surrounding relation to said powder direction plenum for cooling the drying gas and entrained powder during passage through said powder direction plenum upon discharge from said drying chamber for reducing exposure of the powder to damaging temperatures; said powder direction plenum water jacket heat exchanger including a cooling water inlet adjacent one end coupled to a cooling water supply and a cooling water outlet adjacent an opposite end of the powder direction plenum water jacket heat exchanger such that the cooling water from said cooling water supply continuously flows through the powder direction plenum water jacket heat exchanger;
   a connecting conduit water jacket heat exchanger defining an annular cooling water passage in surrounding relation to said connecting conduit; a cooling water inlet adjacent one end of the connecting conduit water jacket heat exchanger annular cooling water passage and a cooling water outlet adjacent an opposite end of said connecting conduit water jacket heat exchanger annular cooling water passage such that cooling water supplied to said connecting conduit water jacket heat exchanger cooling water inlet is continuously directed through said annular cooling water passage of said connecting conduit water jacket heat exchanger for further cooling drying gas and powder exiting the powder direction plenum prior to entering the powder separation plenum and direction to the powder collection container.

2. The electrostatic spray drying system of claim 1 in which said powder direction plenum and surrounding water jacket heat exchanger are conically tapered inwardly in a downstream direction.

3. The electrostatic spray drying system of claim 2 in which said powder direction plenum outlet water jacket heat exchanger comprises inner and outer conical walls that define a conical cooling flow passage.

4. The electrostatic spray drying system of claim 2 in which said powder direction plenum heat exchanger cooling water inlet is adjacent an upper end of said powder direction plenum heat exchanger and said powder direction plenum heat exchanger cooling water outlet is adjacent a lower end of said powder direction plenum heat exchanger.

5. The electrostatic spray drying system of claim 1 in which said cooling water supply to said powder directing plenum heat exchanger is chilled to a temperature of between 4.5° C. and 12.8° C.

6. The electrostatic spray drying system of claim 1 in which said cooling water outlet of said powder direction plenum water jacket heat exchanger is coupled to the cooling water inlet of said connecting conduit water jacket heat exchanger for directing cooling water exiting said powder direction plenum water jacket heat exchanger through said connecting conduit water jacket heat exchanger.

7. The electrostatic spray drying system of claim 1 in which a connecting conduit communicates between a lower end of said powder direction plenum water jacket heat exchanger and an upper end of said powder separation plenum water jacket heat exchanger.

8. The electrostatic spray drying system of claim 1 in which said cooling water supply to said powder direction plenum heat exchanger is effective for cooling heated gas and powder discharging from said drying chamber to temperatures of between 60° C. and 90° C. and for cooling the drying gas and dried powder to temperatures of between 25° C. and 50° C. prior to direction to said powder separation plenum.

9. The electrostatic spray drying system of claim 1 including a gas return line coupled between said powder separation plenum gas outlet and said drying chamber gas inlet for redirecting drying gas into said heating chamber, and a heater disposed within said gas return line for reheating gas prior to redirection of the gas into the heating chamber.

10. The electrostatic spray drying system of claim 9 in which said gas return line includes a condenser upstream of said heater for removing liquid vapor from said gas prior to direction to said heater.

11. The electrostatic spray drying system of claim 10 in which said condenser has a water outlet line for directing condensed water to the cooling water inlet of said powder direction plenum water jacket heat exchanger.

12. The electrostatic spray drying system of claim 11 including a selectively operable valve in said condenser water outlet line for selectively directing condensed water to said cooling water supply or said cooling water inlet of said powder direction plenum water jacket heat exchanger.

13. The electrostatic spray drying system of claim 12 including a temperature sensor in said powder separation plenum for sensing the temperature in said powder separation plenum, and a control for operating said valve in response to temperatures sensed by said temperature sensor.

* * * * *